INVENTOR
JAMES R. COSBY
RALPH E. STURM
BY
AGENT

Fig. 4

Patented Apr. 19, 1949

2,467,948

UNITED STATES PATENT OFFICE 2,467,948

VOLTAGE RESPONSIVE TRIP CIRCUIT

Ralph E. Sturm, Baltimore, and James R. Cosby, Towson, Md., assignors to Bendix Aviation Corporation, South Bend, Ind., a corporation of Delaware Application October 4, 1945, Serial No. 620,284

11 Claims. (Cl. 346—33)

1

This invention relates to apparatus for recording variations in a condition under observation expressed in terms of an electrical voltage, and, more particularly, to such an apparatus in which an indicating operation is performed when a continuously varied search or sweep voltage bears a predetermined relation to the voltage under measurement.

In the recording of quantities whose variations may be expressed in terms of a correspondingly changing electrical voltage, it is known to equip one of the conventional forms of voltage indicating elements with a marking means such as a pen or pencil attached. The additional load imposed upon the marker, carrying pointer by virtue of its contact with the recording medium gives rise to inaccuracies of such degree as to render apparatus of this nature unsuited for many forms of recording. Some effort has been made to solve the problem by the use of a normally freely moving indicating system, whose pointer is intermittently brought into engagement with the surface of the recording medium by a periodically actuated pointer depressing member. It is at once evident, however, that such systems place undesirable shock and deformation loads on the sensitive moving element, the retention of whose long time accuracy is paramount. In still other configurations, follow-up systems have been employed in which the delicate moving element was merely employed as a director, controlling the position of a power driven marking or printing device. Unfortunately, such follow-up systems are subject to errors of a dynamic nature, caused by hunting requiring the inclusion of expensive and sometimes bulky apparatus to avoid error from this source.

Accordingly, it is a primary object of the invention to provide new and novel means for indicating a condition under measurement expressed in terms of voltage, in which the electrical sensing and the mechanically driven elements are completely dissociated.

Another object of the invention is to provide new and novel voltage indicating means in which the indicating operation is performed when a periodically varied search voltage bears a predetermined relation to a voltage under observation.

Another object of the invention is to provide new and novel voltage responsive indicating means in which a search voltage is periodically varied, and in which undesired indications are prevented during the retrace period of the search voltage.

2

Yet another object of the invention is to provide new and novel voltage indicating means of the recording type, in which the load of the recording element is not reflected on the voltage sensitive element.

The above mentioned objects and advantages of the invention may be substantially accomplished in the illustrated apparatus configuration, in which the rotation of a potentiometric device generates a search voltage periodically varying in magnitude and a printing operation is effected when the search voltage becomes equal to the voltage under observation. Printing of false indications is prevented by disabling the printer mechanism during the period when the search voltage is returned to its value at the initiation of the search cycle. This period is hereinafter referred to as the retrace period of the search voltage.

Other objects and advantages of the invention will in part be disclosed and in part be obvious when the following specification is read in conjunction with the drawings in which.

Figure 1:
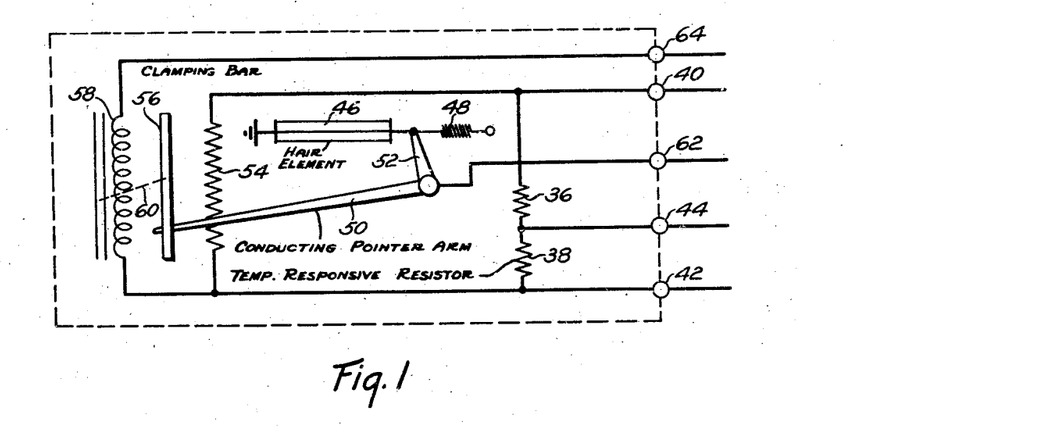
Figure 1 illustrates the electrical structure of a test station.
Figure 2:
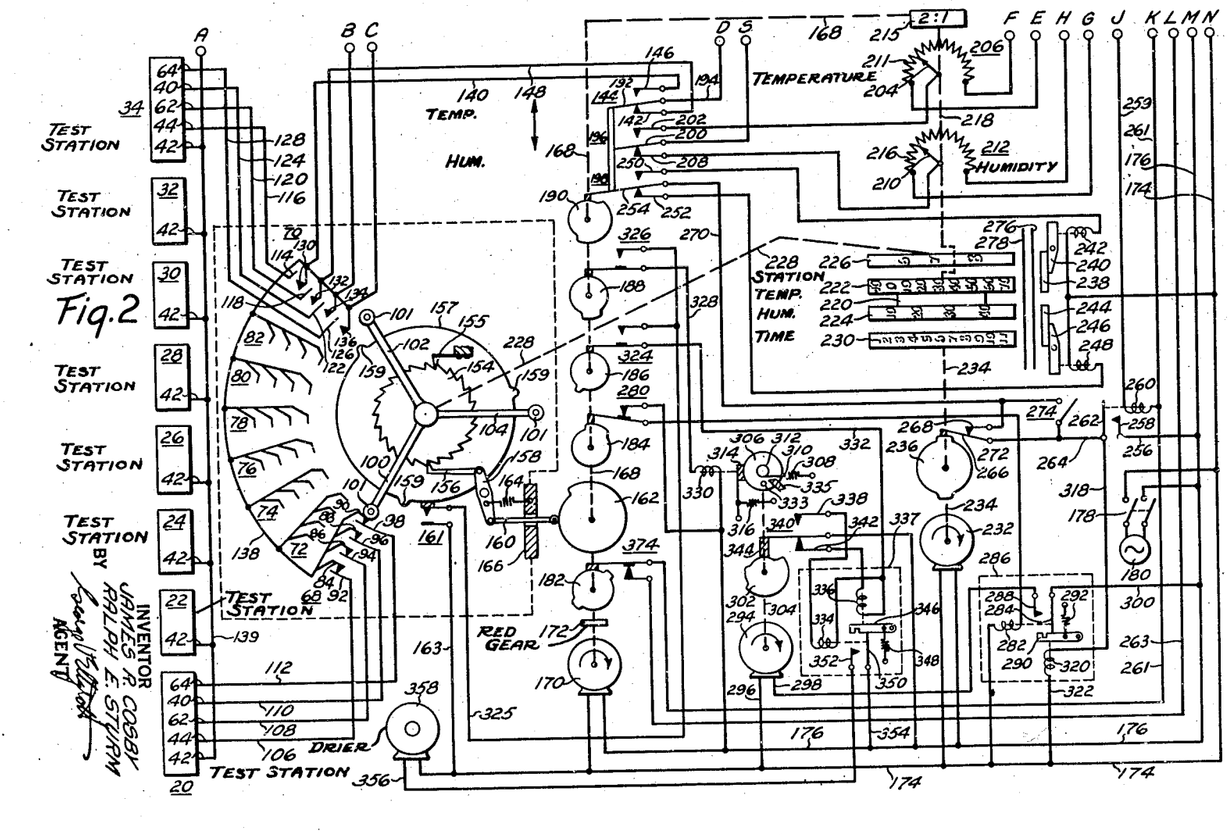
Figure 2 is a schematic representation of the mechanical portion of the structure.

Referring now to Figure 1 there is presented schematically, the electrical structure of the test stations 20, 22, 24, 26, 28, 30, 32 and 34 of Figure 2. Each of said stations includes a temperature responsive measuring element and a humidity responsive measuring element, the internal arrangements at the various stations being the same for all stations. The temperature responsive circuit includes a substantially fixed resistor 36 connected in series with a temperature responsive resistor 38 which may be prepared from various metallic oxides or other mixtures well known in the art. The series combination is connected between the terminals 40 and 42 and the junction of the two resistors is connected to terminal 44.

In operation, an electrical voltage is normally applied between terminals 40 and 42 and the variation in resistance of temperature responsive resistor 38 gives rise to a varying voltage, due to potentiometric action, between terminals 42 and 44, this varying voltage being related to the temperature obtaining at the particular test station. These elements thus comprise the assembly responding electrically to changes in temperature.

For the purpose of determining the humidity existing at the test station, there is incorporated a hair element 46 maintained under tension by the associated spring 48 and linked by arm 52 to a rotatable shaft bearing a conductive pointer 50. The end of pointer arm 50 is movable in proximity to a resistor 54 electrically connected with the test circuit energizing terminals 40 and 42, but not normally in mechanical engagement with resistor 54.

The clamping bar 56 is located over an extension of the arm 50 and is adapted to drive pointer 50 into engagement with resistor 54 in response to energization of the relay operating coil 58. The mechanical link to the clamp bar 56 is indicated at 60. The clamp bar 56 is preferably constructed of nonconductive material to avoid disturbance of the associated electrical circuits. The pointer arm 50 is conductively connected to terminal 62 and impresses between the terminals 42 and 62 a variable voltage controlled by the position of the pointer arm 50 on the resistor 54, which voltage is, therefore, indicative of the humidity existing at the test station concerned. One end of the relay operating coil 58 is tied to the common terminal 42 while the other end of said coil 58 receives energy from the relay feed terminal 64.

The method of incorporation of the individual stations in the over-all test scheme appears in Figure 2, illustrating a plurality of test stations 20, 22, 24, 26, 28, 30, 32 and 34 placed strategically about the structure or space in which, say, the humidity is to be controlled. Each of the stations contains the same operating elements as detailed in connection with Figure 1, and the same characters are employed in designating the corresponding connecting terminals to each of the units, the station under discussion at any point in the text being indicated by its basic designation number as; for example, station 20.

The various test stations are successively placed in control of metering or measuring apparatus by the action of a selector assembly 66. The selector assembly 66 includes, as shown, eight radially disposed and spaced leaf-spring switch pile-up assemblies, two of which 68 and 70, connected respectively to stations 20 and 34, are shown in detail, the remaining switch pile-ups being merely indicated at 72, 74, 76, 78, 80 and 82. The switches appear schematically shown in the drawing as viewed from their end. The switch assembly 68 is composed of four single-pole single throw switches made up of four movable leaf-spring borne contacts 84, 86, 88, and 90 insulatingly linked by a tie element to move as a mechanical unit. Fixed contacts 92, 94, 96, and 98 cooperate respectively with the movable contacts 84, 86, 88 and 90, being in engagement with the associated contact when the innermost leaf spring 90 is driven radially outward by one of the rollers 101 at the end of the switch actuating arms 100, 102 and 104, which may be angularly spaced approximately 120 degrees. The outermost fixed contact 92 is linked to the temperature terminal 44 of station 20 by the lead 106; the next inwardly situated contact 94 is linked to the humidity terminal 62 of station 20 by lead 108; the next inwardly spaced fixed contact 96 is conductively connected with the test circuit energizing terminal 40 of station 20 by lead 110 and the innermost fixed contact 98 is attached to the relay energizing terminal 64 of station 20 by the lead 112.

The fixed contacts corresponding radially in position to those in switch pile-up 68 whose detailed connection to station 20 has just been recited, are similarly connected to the remaining test stations, the detail of such connections being omitted from the drawing, since they are merely duplicates of those already shown, for the purpose of simplifying the presentation. Switch pile-up 72 serves station 22, switch pile-up 74 serves station 24, switch pile-up 76 serves station 26, switch pile-up 78 serves station 28, switch pile-up 80 serves station 30 and switch pile-up 82 serves station 32.

The detail of the connection of the fixed contacts of switch pile-up 70 to test station 34 is also shown to simplify the tracing of the cooperating interrelationship. In switch pile-up 70, the outer fixed contact 114 serves temperature contact 44 of station 34 through lead 116, fixed contact 118 serves humidity contact 62 of station 34 through lead 120, fixed contact 122 serves test circuit energizing contact 40 of station 34 through lead 124, and innermost fixed contact 126 serves relay terminal 64 of station 34 through lead 128. The movable contacts 130, 132, 134 and 136 of switch pile-up 70 cooperate respectively with the associated fixed contacts 114, 118, 122 and 126 and are connected to the corresponding movable contacts of the balance of the switch pile-up terminals through the inter-connecting cable represented diagrammatically at 138. As seen, this cable inter-connects, in addition to the corresponding movable contacts on the intermediate switch pile-up assemblies, movable contacts 130, 132, 134 and 136 of the switch pile-up 70 respectively to the movable contacts 84, 86, 88 and 90 of the switch pile-up 68.

In addition to the connection of the operating terminals of the various stations thus far discussed, the common terminals 42 of each of said stations are connected together and to the common line 139 which establishes a connection to terminal A for input to the metering circuits. The remainder of the connections necessary for the transfer of output from the measuring elements to the metering apparatus pass through the temperature lead 140, extending from the cable connected to movable contact 130 to the upper contact 146 of a single-pole double-throw cam actuated switch assembly 144; from the cable connection at movable contact 132 to the lower fixed contact 142 of the single-pole double-throw switch 144 through humidity lead 148, from the cable connection at movable contact 134 through test circuit energizing lead 150 to the alternating current output terminal B of the metering apparatus and from the cable connection at movable contact 136 through the relay energizing lead 152 to the direct current output terminal C of the metering apparatus. The spring leaf switch pile-up assemblies 68 to 82 are arranged for successive actuation, as previously noted, by the passage of the associated actuating arms 100, 102 and 104 tipped with rollers 101. The actuating arm assembly is driven by the ratchet wheel 154, to which it is rigidly connected.

As shown in the drawing, ratchet wheel 154 is adapted for clockwise rotation through the action of the cooperating pawl 156 and ratchet stop 155. The pawl 156 is reciprocably driven through the rocker arm 158 attached to the push rod 160 whose nose engages the station advance cam 162. On the forward stroke of the push rod the pawl 156 is gradually returned from its extended position as the push rod 160 moves to the left, extending the spring 164 having one end connected to the rocker arm 158 and the other attached to a fixed portion of the machine as at 166. When the push rod 160 falls off the step on cam 162, the rocker arm 158 is snapped in a counter-clockwise direction under the influence of stored energy in spring 164 driving the actuator arm assembly through an angle substantially equal to the spacing angle of the switch pile-up assemblies.

The station advance cam 162 is located on a main drive shaft 168 driven by the main drive motor 170 through the reduction gearing unit 172. As shown, the motor 170 is electrically powered, receiving energy from the power bus lines 174 and 176, which may be linked to a commercial power line circuit at 180 through the switch 178. In addition to the station advance cam, the shaft 168 may drive or carry a number of switch actuating cams, those shown being the tapper circuit disabling cam 182, the summation initiating cam 184, the control latch relay energizing cam 186, the summation reset cam 188 and the temperature/humidity selector cam 190.

The single-pole double-throw switch 144, whose connection with the measuring elements and selector switch 66 has been previously treated, is included in a group of three switches operated by the temperature/humidity cam 190. When the cam follower is on the low portion of the cam 190 the movable arm 192 of single-pole single-throw switch 144 engages contact 142 connecting the humidity responsive output from the active test station through line 194 to the terminal D, which is the measured signal input terminal of the voltage responsive metering circuit later to be described. Included in the switch assembly driven by temperature/humidity cam 190 are the single-pole double-throw sweep potentiometer selector switch 196 and the single-pole double-throw tapper circuit selector switch 198.

The central contact arm 200 of sweep potentiometer selector switch 196 is alternatively engageable with an associated upper contact 202 connected to the rotatable arm 204 of the temperature sweep potentiometer 206, and with lower contact 208 connected to the movable arm 210 of the humidity sweep potentiometer 212. The temperature sweep potentiometer 206 has the extremities of the active resistance winding 211 connected to the terminals E and F of the main electrical unit from which it receives an adjustable potential through a circuit of adjustable internal impedance. Similarly, the extremities of the active resistance element 216 of the humidity sweep potentiometer 212 are connected to the terminals G and H of the main electrical unit to which there may be applied an independently variable voltage from a source of independently variable impedance. The angular sector occupied by the active resistance elements 211 and 216 occupies the greater portion of the full circular arc of 360° as indicated in the drawing of Figure 2. In the usual structure, the winding sector will be of the order of 300° with the intervening gap 60° or less.

The temperature sweep arm 204 and the humidity sweep arm 210 are driven by a shaft 218 rotating at such a rate that it makes two complete revolutions per revolution of the main drive shaft 168. For the sake of illustration this is shown to be accomplished by the interposition of a 2:1 step-up transmission gearing unit 215 linking the main drive shaft 168 and the sweep shaft 218. In addition to driving the sweep potentiometer arms, shaft 218 also carries with it a printing wheel 220 provided with two sets of characters 222 and 224, the former of which corresponds to temperature indications while the latter corresponds to the humidity conditions to be recorded. The printer wheel 220 is indicated as forming part of a unit assembly including two other printer wheels, one of which, the station printer wheel 226, is connected with the intermittently indexed ratchet wheel 154 through the mechanical linkage indicated as 228. The remaining printer wheel 230 bears characters identifying the time of a given observation, and is driven from the timer motor 232 through the timer shaft 234, also carrying the printer control cam 236. The timer motor 232, like the rest of the motive power in the assembly, is fed with alternating current from the main supply buses 174 and 176.

From the description and the schematic portrayal of the printer wheel assembly, it is apparent that wheels 220, 226 and 230 are revolvable independently of one another. Printer wheel 226 and character set 222 of printer wheel 220 are located adjacent to tapper bar 238, mounted on a rocker arm 240 adapted for actuation in response to energization of an associated relay coil 242. The time printer wheel 230 and character set 224 of printer wheel 220 are in cooperative relationship with a second tapper bar 244, mounted on rocker arm 246 adapted for actuation by the associated relay coil 248. One end of each of the tapper operating relay coils 242 and 248 is connected together and to the main power bus 174, the free end of the temperature tapper coil 242 being connected to the upper contact 250 of the tapper circuit selector switch 198, while the free end of the humidity tapper coil 248 is connected to the lower terminal 252 of said tapper circuit selector switch 198. The movable central contact 254 of tapper selector switch 198 is fed with energy from the main power bus 176 through line 256, the fixed contact 258 of tapper control relay 260, the movable contact 262 of tapper control relay 260, line 264, the normally disengaged movable contact 266 and fixed contact 268, comprising the printer control switch 272, and the line 270. The automatic printer control switch 272 is shunted by the manually operable single-pole single-throw switch 274. When switch 274 is open and the printer control cam 236 is revolving at a normal speed of once every 24 hours no printing operation will take place, until the elevated portions of the cam 236, which may be designed to each occupy an arc corresponding to fifteen minutes of revolution, pass under the cam follower, at which time the switch 272 is closed and the tapper relay circuits will be energized upon each closure of the contacts of the tapper control relay 260, in response to impulses arriving from the main electrical unit through terminals J and K and leads 259 and 261. Selection of the tapper bar to be energized is automatically made by the operation of the tapper circuit selector switch 198 to print data corresponding to the instantaneous condition under observation. The actual printing takes place on the conventional strip chart 276 located adjacent the tapper bar, through the action of an adjacent inked band or carbon ribbon 278 situated between the strip chart and the character bearing printing wheels. The chart feed is conveniently of the solenoid or ratchet advance type, in which the strip chart is advanced once for each tapper bar operation. When it is desired to effect a continuous printing operation the switch 274 may be closed to effectively remove the printer control switch 272 from the circuit.

When the low portion of the temperature/humidity cam 190 is under the cam follower, humidity measurements are made, and when the high portion thereof passes under the cam follower temperature measurements are made. The summation initiating cam 184, rotating synchronously with the temperature/humidity cam 190, is provided with an elevated portion, called the cam rise, starting somewhat subsequent to the low portion of cam 190 and occupying a sector of perhaps 30 degrees. This cam operates an associated summation initiating switch assembly 280 which is closed when the cam follower is on the rise of cam 184, and open at all other times. The summation initiating switch assembly 280 is connected in series with the summation latch-in relay winding 282 across the main power bus line 174, 176. When switch 280 closes to energize the relay coil 282, the movable contact 284 of the summation latch relay 286 is pulled against the adjacent fixed contact 288, while at the same time its free end slips into the latch-in notch of the latch bar 290 urged upward by an attached spring 292. Contacts 284, 288 therefore remain in engagement even after the removal of voltage from the relay latch-in coil 282. Closure of contacts 284, 288 completes the power input circuit for summation motor 294 to the main power supply bus line 174 through lead 296 and to the main power supply bus line 176 through lead 298, contacts 284, 288 and lead 300. The motor 294 when so energizing turns in a clockwise direction, driving a control cam 302 through the shaft 304, also carrying a brake wheel 306. When so operating, the spring 308 is extended as the cord 310 is wound on a drum 312 which is an integral part of the brake wheel 306. In so driving the brake wheel 306, the summation motor 294 also overcomes the resistance of a brake shoe 314 maintained in frictional engagement with the periphery of the brake wheel 306 by a spring 316. When the tapper control relay 260 is energized from the main electrical unit to close contacts 258, 262, the lead 318 extending from contact 262 to latch release coil 320, and lead 322 extending from the other terminal of latch release coil 320 to the power buses 174, 176 serve to energize the latch release coil 320 pulling down the latch bar 290, releasing the movable contact 284 which thereupon opens the electrical circuit to the summation motor 294. The delay between the initiation of the operation of the summation motor 294 and its interruption, is determined by the value of the humidity existing at the test location, since the actuation of the tapper control relay 260 occurs at a time delayed over initiation of the summation motor operation by the length of time taken for the movable arm 210 of the humidity sweep potentiometer 212 to reach a point developing a voltage proportional, in this case, equal, to the output of the humidity sensing element. Upon the opening of the summation control switch 284, 288 and the interruption of the power supply to the summation motor 294, return of the control cam 302 to its initial position is prevented through the action of the brake shoe 314 resting on the brake disc 306 affixed to summation shaft 304. Each time that a new station is placed in connection with the metering circuit this sequence of operation repeats. After the summation of the indications from, in the illustrated example, eight test stations, the summing mechanism is cleared or reset to zero by the apparatus next to be described.

In addition to the selector switch actuator arm the ratchet wheel 154 also drives the recycle cam disc 157, having on its periphery three projections 159. Simultaneously with the actuation of switch pile-up assembly 70, the recycle cam projection 159 passes under the follower of the normally open cam switch 161, having one terminal thereof connected to the power bus 174, through lead 163 and the other terminal connected to one pole of the control relay energizing switch 324 through lead 325, and to one pole of summation reset switch 326. The summation reset cam 186 is provided with a cam rise beginning somewhat subsequent to the start of the high portion of the temperature/humidity cam 190 to prevent operation of the switch 326 prior to the completion of the humidity measuring operation. The closure of the control relay energizing switch 324 also occurs after the start of the high portion of the temperature/humidity cam 190, but the switch 324 opens prior to the closure of the summation reset switch 326. The switch 326 may remain closed for substantially 60 degrees of rotation of the main drive shaft 168. When the switches 161 and 326 are simultaneously closed, the lead 328 connected to one terminal of the summation reset relay coil 330 having its other terminal connected to the main power bus 176, serves to impress on said summation reset relay coil 330 energy from line 174 through recycle switch 161 and reset switch 326. The relay coil 330 is so situated with respect to the arm bearing brake shoe 314, as to draw same back against the tension of spring 316, releasing the brake disc 306 from restraint and permitting it to rotate counterclockwise under the influence of restoring spring 308 acting on cord 310 until the stop pin 333 strikes the reference abutment 335, which may be affixed to the frame of the apparatus.

Somewhat prior to this reset operation, however, the cam rise on the control latch relay energizing cam 186 closes the control relay energizing switch 324, whose movable pole is connected through lead 332 to one terminal of the control latch-in relay coil 334 and one terminal of the control latch release relay coil 336. The free terminal of the control latch-in relay winding 334 is connected with the upper fixed terminal 338 of the single-pole double throw summation cam switch 340, and the free end of control latch release relay winding 336 is connected with the lower fixed contact 342 of the summation cam switch 340. So long as the cam follower of the switch 340 rotates on the lower dwell of the summation cam 302 the movable member 344 of the summation cam switch 340 is in engagement with the lower contact 342 and thus connected to the latch release relay winding 336.

As the summation cam 302 rotates clock-wise the intermediate dwell portion thereof passes under the cam follower, moving the central switch element 344 to a position clearing both the associated contacts, whereby it is connected with neither of the control latch relay coils. Continuing rotation of the summation cam 302 brings the high dwell under the cam follower of 340 driving central contact 344 into engagement with upper contact 338 to connect it with the control latch-in relay winding 334. It is to be noted that the energy supplied through main power bus 174 to the control latch relay circuits passes through lead 163 and the recycle switch 161 and lead 325 only when the recycle switch 161 and control relay energizing switch 324 are simultaneously closed, as at the end of the completion of an averaging sequence. Then, and only then, power bus energy appears at lead 332 and a circuit through one of the control latch relay coils is completed in accordance with the position of summation cam switch 340. If on the low dwell portion of the cam, as illustrated in the drawing, the latch release relay coil 336 is connected to power bus 176 through contacts 342, 344 drawing up the latch bar 346 against the action of tension spring 348 permitting the movable contact 350 to move out of engagement with the fixed contact 352. In the event the cam follower is on the high dwell, the latch-in relay coil 334 is connected to the power bus 176 through contacts 338 and 344 and pulls movable contact 350 into engagement with the contact 352, while at the same time the latch bar 346 slips down over the free end of contact 350, maintaining same in engagement until actuation of the control latch release relay 336. Closure of contacts 350, 352 establishes a connection from line 176 through lead 354 and lead 356 to a dehumidifier motor 358 whose remaining terminal is directly connected to the power bus 174. The excessive humidity is then corrected.

By the time the reset switch 326 closes, the control energizing switch 324 has already re-opened, for it has a short closure period so that the resetting of the summing mechanism does not disturb the position of the control latch relay 337. When the control latch relay energizing switch 324 closes subsequently, the ratchet wheel 154 will have been indexed one position forward to bring the projection 159 on the recycle cam 157 out from under the follower of recycle switch 161 to open same and maintain the control relay energizing circuit non-operative until the completion of another averaging operation. It is to be noted that the last selected position of the circuit controlling contacts 350, 352 is maintained so long as the follower of summation switch 340 remains on the intermediate dwell portion of the summation cam 302 and that, by varying the length of the intermediate dwell portion the operating differential may be correspondingly controlled.

Figure 4:
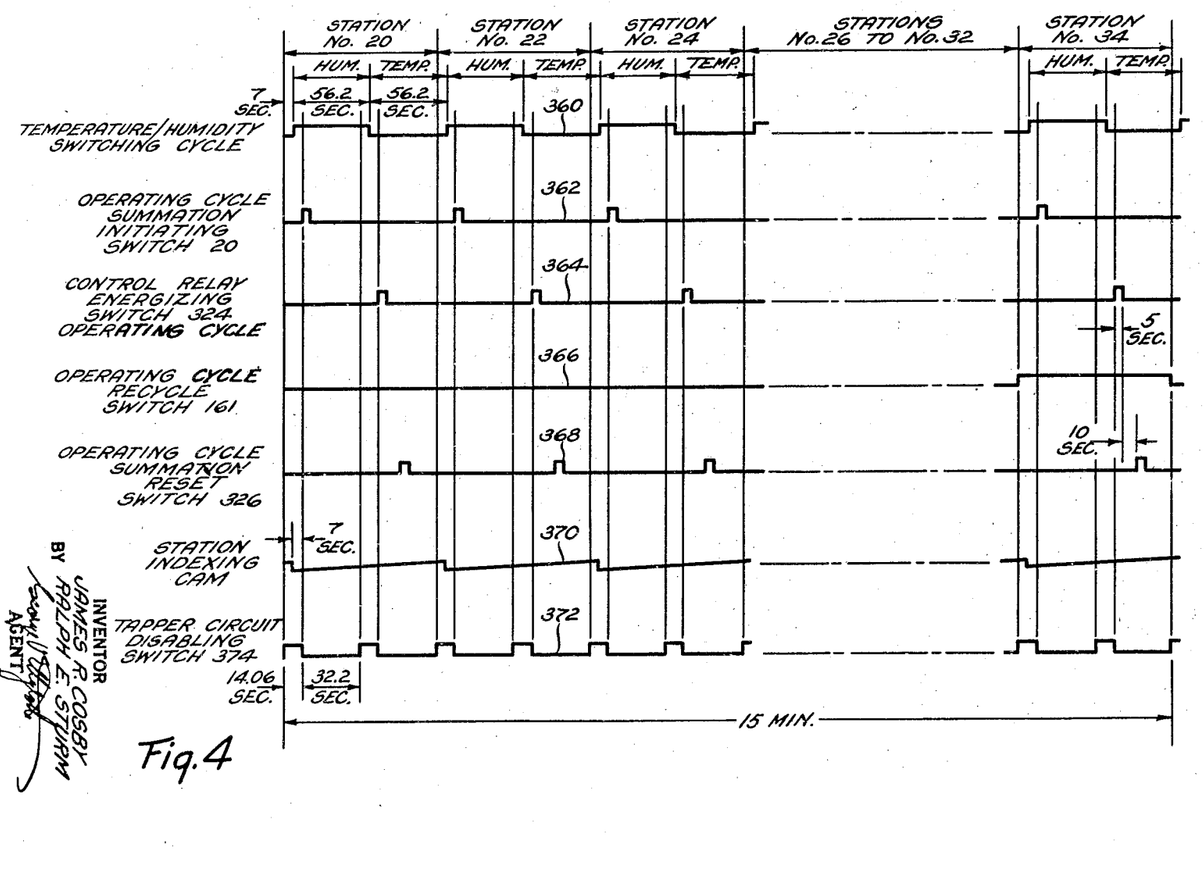
Figure 4 is a sequence diagram illustrating the interlocking operation of the various cam actuated switches.

The operating sequence of the various cam control switches based on a 15 minute averaging cycle is clearly portrayed in Figure 4, wherein the graph 360 illustrates the manner and duration of operation of the switches under control of the temperature/humidity cam 190. 362 is indicative of the operating cycle of the summation initiating switch 280 operated by cam 184. This switch closes somewhat subsequent to the establishment of the humidity measuring connections and it is opened shortly thereafter. The control relay energizing switch 324 operates under control of cam 186 in the manner illustrated at 364, the switch closing shortly after the completion of a humidity measurement. This switch is, however, as previously described, wired in series with the recycle switch 161 closing only on the completion of test at eight stations, this being shown in the diagram at 366. After the control relay energizing switch 324 is closed and opened after actuating the control latch relay 337, the summation reset switch 326 is closed under the influence of cam 188 in the cycle shown at 368. The operation of the station advance cam 162 appears at 370, each of the discontinuities of the saw tooth characteristics corresponding to an advance of the switch actuator arms in the selector assembly 66 from one switch pile-up to the next. The significance of the switch sequence diagram 372, which illustrates the action of the tapper disabling switch 374 under the influence of cam 182, will be more thoroughly discussed after an analysis of the circuit of the main electrical unit.

Figure 3:
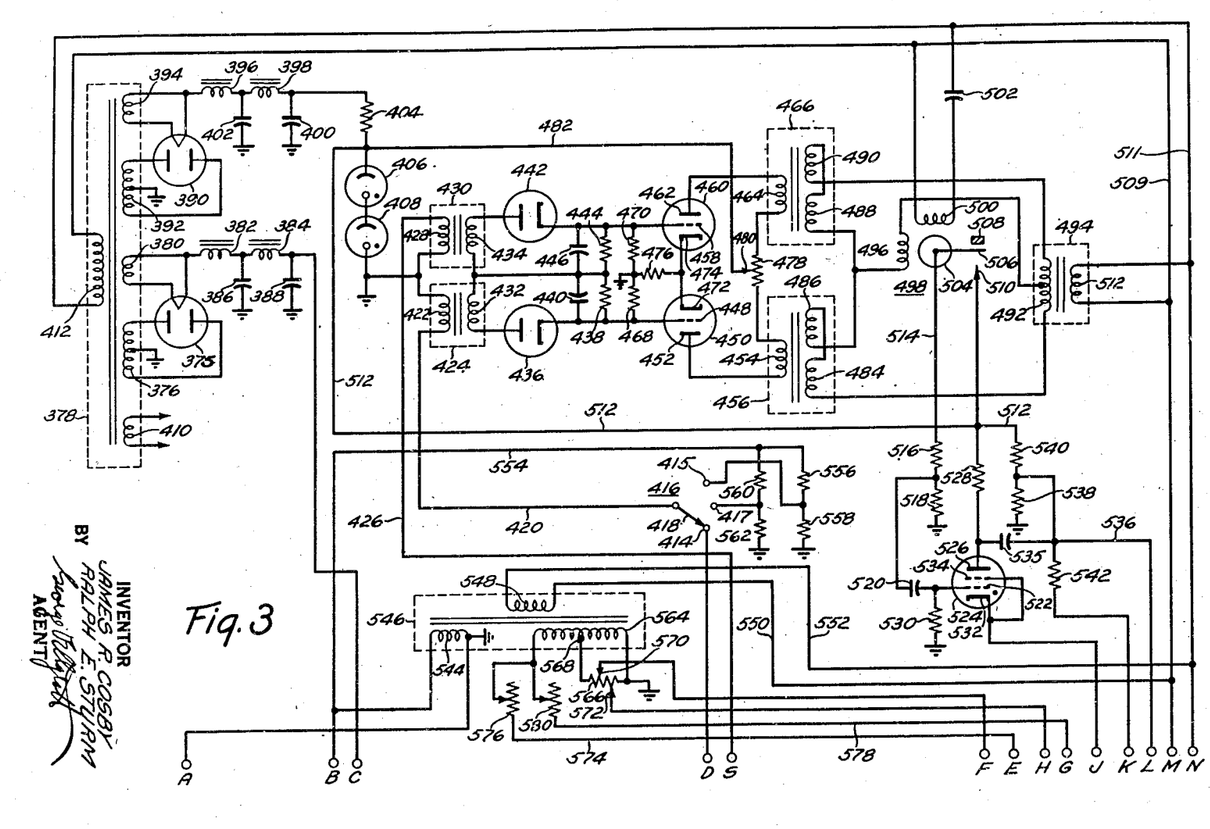
Fig. 3 is a schematic diagram of the electrical portion of the apparatus including the metering circuits.

Reference for the structure of the electrical unit is now made to Figure 3 in which the electrical connections are shown brought out to terminals identified by letters, the terminals in Figure 2 and Figure 3 bearing the same identifying letter being connected in normal operation of the apparatus. The direct current output terminal C supplying energy for the humidity pointer clamp relay 58 at the test stations is fed with rectified energy derived from the heater circuit of the full wave rectifier 375 having its anodes connected to either end of the center tapped secondary winding 376 of the transformer 378. The center tap of the winding 376 is grounded to supply a negative return. Heater energy for the rectifier 375 is supplied from secondary 380 from one terminal of which the direct current output passes through filter chokes 382 and 384 to the output terminal C. The possibly troublesome hum component is removed from the output existing at terminal C by the connection of filter capacitor 386 to ground from the junction of chokes 382 and 384 and the connection of output filter capacitor 388 between terminal C and ground. As is evident from the description and schematic, this comprises the usual choke input, full wave rectifier characterized by rather good regulation between no load and full load. The power transformer 378 is also provided with another set of windings for supply anode circuit energy to a number of vacuum tubes incorporated in the main electrical unit. This anode supply includes another full wave rectifier tube 390, having its anodes connected to either end of the center tapped secondary winding 392 and deriving its heater circuit energy from the secondary winding 394. Grounding the center tap of the secondary 392 provides a negative return to the rectifier circuit, and the positive output lead is taken from one side of the heater winding 394 through chokes 396 and 398 in series. The ripple component is eliminated from the rectifier output by filter capacitors 400 and 402 connected between the output and intermediate choke terminal and ground. The output of this rectifier combination is connected through limiting resistor 404 and the two cold cathode gas discharge voltage regulating devices 406, 408 to ground. There thus appears between the anode terminal of the gas discharge regulator 406 and ground a voltage substantially independent of the alternating potential existing in secondary winding 392 and of reasonable variations in the load current drawn from said circuit.

The power transformer 378 also has a winding 410 to provide heater power for the remaining tubes in the apparatus. These heaters have been omitted in the drawing for the sake of clarity since their use and circuits for energizing same are well known in the art. The energy for the various secondary loads of power transformer 378 is derived from the primary 412 connected to the main power bus 174, 176 through the terminals M and N.

The measured signal input to the electrical unit arrives from the assembly of Figure 2 at terminal D connected to contact 414 of the calibration switch 416. When the rotatable arm 418 is in engagement with said contact 414, the measured signal passes on through the line 420 to one terminal of the primary 422 of measured signal input transformer 424. The remaining terminal of primary 422 is connected to ground as shown. The sweep signal input from the potentiometer circuits is impressed on terminal S and thence via lead 426 on one terminal of the primary 428 of the sweep signal input transformer 430 whose other primary terminal is grounded. Each of the transformers 424, 430 is provided with a secondary winding 432, 434, respectively, one each of the terminals of said secondary windings being connected together. The free terminal of winding 432 is connected through diode rectifier 436 to a load resistor 438 shunted by a filter capacitor 440 while the free terminal of secondary 434 is connected through the sweep signal rectifying diode 442 to the load resistor 444 shunted by filter capacitor 446. The remaining terminals of load resistors 438, 434 and filter capacitors 440, 446 are joined together and connected to the common terminal of secondary winding 432, 434. There is no ground in this portion of the circuit.

The end of resistor 438 attached to the cathode of diode 436 is connected to the control grid 448 of the triode valve 450 having its anode 452 connected to the D. C. winding 454 of the saturable core reactor 456. Similarly, the end of resistor 444 attached to diode 442 is connected to the control grid 458 of the triode thermionic valve 460 whose anode 462 is connected to one terminal of the D. C. control winding 464 of a saturable core reactor 466. The direct current path between the grids and cathodes of the triode valves is completed by the connection of resistors 468 and 470 in series between the control grids 448 and 458, the junction point of said resistors being connected to ground. The cathode 472 of triode valve 450 and cathode 474 of triode thermionic valve 460 are connected together and to one terminal of the bias resistor 476, whose other terminal is grounded. Anode excitation for the thermionic tubes 450 and 460 is supplied by the connection of one terminal each of the D. C. control windings 454 and 464, to either end of a resistor 478 having a tap 480 movable thereover connected to the anode terminal of regulator 406 through the lead 402. Unbalance in the characteristics of the tubes and the saturable core reactors is corrected by adjusting the tap 480 to balance the impedance of the saturable core alternating current windings, with no signal input at terminals S and D.

The pair of tubes 450 and 460 constitute a differential voltmeter in which the anode current of each tube is caused to vary symmetrically from its quiescent value in response to unbalance between the measured signal input at terminal D. The saturable core reactor 456 is provided with two alternating windings 484 and 486, connected in series phase opposition to minimize alternating current flux flowing in the core structure. Likewise the reactor assembly 466 includes two alternating current windings 488 and 490, also connected in series to minimize the alternating flux resulting from the presence of A. C. in the control windings. The free terminal of A. C. winding 484 is connected with one terminal of a center-tapped secondary 492, of a motor supply transformer 494, and the other end terminal of secondary 492 is connected with the free end of A. C. winding 490. The transformer 494 is energized by the primary 512 having its terminals connected across the main power bus lines 509 and 511 fed from terminals M and N.

The free terminals of windings 486 and 488 are connected together, and to one terminal of the field winding 496 of the drag-cup motor indicated at 498. The other field winding 500 included in the drag-cup motor is connected to the main power supply bus lines 509 and 511 through a phasing capacitor 502. The drag-cup 504 of the motor 498 has affixed thereto a conductive arm 506, adapted to move between the fixed insulating abutment 508 and a contact 510. The contact 510 is connected with the anode of the gas discharge regulator tube 406 through anode bus lead 512. The windings 496 and 500 are disposed in space quadrature adjacent the drag-cup 504, and as is well known, when a current passes through one of the windings having a quadrature component with respect to the current passing through the other of said windings, the rotating magnetic field carries the drag-cup 504 with it, due to interaction of eddy currents appearing in the drag-cup 504 and said rotating magnetic field.

So long as the impedance presented by saturable core reactors 456 and 466 is equal, no current flows in the central leg formed by the connection of field winding 496 between the common terminal of the A. C. windings thereof and the center-tap of transformer 492. As soon as there is an unbalance in the impedance of the saturable core reactors 456 and 466, an equalizing current flows through field winding 496, the phase of this current, with respect to the voltage across winding 492, varying in accordance with the sense of impedance unbalance. Hence, with an impedance unbalance of one sense, the drag-cup 504 rotates counter-clockwise driving the pointer 506 into contact with the abutment 508, and when the sense of the impedance unbalance reverses the drag-cup 504 rotates clockwise, bringing arm 506 into engagement with the contact 501. The point at which this change in the tendency of drag-cup 504 to rotate occurs when the impedance of the two saturable core rotators 456 and 466 passes through the balance point.

The arm 506 is connected through lead 514 to the series connected resistors 516 and 518. One terminal of resistor 518 is grounded and the ungrounded terminal of said resistor 518 is connected through coupling capacitor 520 to the grid 522 of a gas tetrode 524, whose anode 526 is connected to the anode supply bus 512 through a limiting resistor 528. The grid leak 530 is connected between grid 522 and ground and the cathode 532 is connected with the shield grid 534 and to the tapper impulse output terminal J. The return circuit from the operating coil of the tapper control relay 260 to the tapper impulse circuits is completed through terminal K and resistor 542 to lead 536. Terminal L is connected directly through lead 536 to the ungrounded terminal of resistor 538, situated in a voltage divider including resistor 540 connected between anode supply bus 512 and the ungrounded terminal of resistor 538. The tapper impulse energy is derived from the storage capacitor 535 connected between anode 526 and the lead 536.

The voltage drop across resistor 538 makes the cathode 532 positive with respect to ground and hence provides operating bias potential between cathode 532 and control grid 522 which is grounded through resistor 530. The terminals K and L, in Figures 2 and 3, are connected through leads 261 and 263 with the normally closed tapper circuit disabling switch 374 of Figure 2. The switch 374 is opened whenever a rise of the tapper disabling cam 182 passes under the follower of the tapper disabling switch 374. When closed, the switch 374 short circuits terminals K and L to remove the surge limiting resistor 542 from the circuit including the reservoir capacitor 535, the tapper control relay coil 260 and the anode-cathode path of the gas tetrode 524. This condition obtains during the active portion of the measuring cycle. During the retrace of the sweep voltage, which is to say during the transit time of the arms 204 and 210, between the open ends of their associated resistance windings, the switch 374 is maintained in open circuit position thereby inserting surge limiting resistor 542 to prevent actuation of tapper control relay coil 260, and the tapper bars 238 and 242 under its control.

In the course of normal operation, when the arm 506 engages contact 510 a positive pulse is transmitted through capacitor 520 to the control grid 522 of the gas discharge tetrode 524. This tube will usually have been in the quiescent state for some time previously, permitting the capacitor 535 to charge from the anode supply bus 512 through the limiting resistor 528. When a positive pulse is applied to the grid 522 at the same time that the anode 526 is maintained positive by capacitor 535, ionization is initiated within the tube 524, permitting current conduction there-through with relatively low voltage drop, so that the capacitor 535 may be regarded as instantaneously connected across the operating winding of tapper control relay 260, when the switch 374 is in the closed circuit condition shunting out surge limiting resistor 542. In the event that switch 374 is opened, the peak surge current which can be developed through resistor 542 is so reduced in magnitude that it is unable to overcome the opposing spring force of relay 260, which is hence prevented from operating and no mark is impressed on the associated strip chart, although the reactors 456 and 466 may have returned through the balance point. It is thus apparent that the tube 524, reservoir capacitor 535, and motor 498 driving contact arm 506 comprise a current surge generator delivering current surges capable of operating tapper control relay 260 whenever the surge limiting resistor 542 is shunted out of the capacitor discharge circuit by the switch 374.

The time sequence diagram of Figure 4, clearly illustrates the operation of the tapper disabling switch 374 to insert surge limiting resistor 542 during the switching interval between the two types of testing operation and an overlapping period on either side thereof. The switch open dwell of cam 182 may preferably occupy a time interval substantially equal to or somewhat greater than that required for the passage of the sweep potentiometer arms through the inoperative azimuthal portion of rotation represented by the angle subtended by the terminal points of the associated resistance windings. The presence of two cam rise intervals on the tapper circuit disabling cam is necessitated by the 2:1 speed ratio between shafts 168 and 218.

The alternating potential required for the energization of the measuring elements of the various test stations is derived from the test circuit energizing secondary 544 of transformer 546, whose primary 548 is connected with the A. C. busses 509 and 511, through leads 550 and 552. One terminal of winding 544 is connected to the ground and to the common terminal A, while the other terminal thereof is connected with A. C. output terminal B and, through lead 554, with the voltage divider resistance net works 556, 558 and 560, 562 whose other terminals are connected to ground. The intermediate point on divider 556, 558 is connected with the contact 415 of calibration switch 416, and the intermediate point on voltage divider 560, 562 is connected with contact 417. Movement of the contact arm 418 of calibration switch 416 thus offers means for impressing predetermined voltages on the primary 422 of the measured signal input transformer 424 for calibration of the apparatus in a manner subsequently to be outlined.

In addition, transformer 546 carries a sweep signal secondary winding 564, having an intermediate tap 568 brought out. One end of sweep signal secondary 564 is connected to ground and a resistor 566 is connected between this grounded secondary terminal and tap 568. The adjustable tap 570 is movable over resistor 566, and connected with terminal F to provide for adjustment of the voltage applied to the temperature sweep potentiometer 206. Also movable over resistor 566 is a tap 572 connected with terminal H and providing for an adjustment of the voltage applied to the humidity sweep potentiometer. The other end of the temperature sweep potentiometer circuit returns through terminal E, the line 574 and the adjustable resistor 576 to the ungrounded end terminal of sweep signal secondary winding 564. The inclusion of adjustable resistor 576 in the sweep potential energizing circuit, permits regulation of the effective source impedance. The circuit from the humidity sweep potentiometer 212 returns to terminal G, through lead 578 and adjustable resistor 580 to the ungrounded end terminal of sweep secondary winding 564, which arrangement also provides for adjusting the impedance of the source of excitation voltage.

With the foregoing in mind, the operation of the apparatus is readily understood. With the closure of switch 178, the timer motor 232 and main drive motor 170 are energized. It will be assumed that the station selector is in the position shown at Figure 2. The clamp relay coil 58 of station 20 is energized through lead 112, cable 138 and lead 152 to engage the humidity pointer 50 with its associated resistor strip 54. This impresses on the terminal 62 a voltage indicative of the humidity which is transmitted to the temperature/humidity measuring signal selector switch 144 with the apparatus in the condition of Figure 2. This voltage passes on to the measured signal input terminal D of the measuring apparatus. So long as the low dwell of cam 190 is under the cam follower, this connection is maintained. The A. C. energy for exciting the measuring elements at station 20 passes from terminal B through the lead 150, cable 138 and lead 110 to terminal 40. As the shaft 168 continues to rotate the summation initiation switch 280 is closed to latch-in the summation relay 286 and set the summing motor 294 in motion. With the continuing rotation of shaft 168, initiating switch 280 reopens, but the operation of summation motor 294 continues because of the latch-in action of relay 286.

Initially, a high sweep signal voltage is derived from the humidity measuring potentiometer 212, and impressed on sweep signal input signal terminal S, causing an unbalance in the output of the diodes 436 and 442, up-setting the impedance balance of the saturable core reactors 456, 466 because of the different anode currents flowing through the thermionic valves 450 and 460. The poling of the motor and control circuit connections is such that, for this condition, the arm 506 connected to the drag-cup motor 498 is forced against the abutment 508. As the arm of the humidity sweep potentiometer 210 continues to rotate, the voltage applied to terminal S through the temperature/humidity sweep selector switch 196, passes through a value equal to the measured signal input at terminal D. At this time, the impedance unbalance between saturable core reactor 456 and 466 is reversed, causing a reversal in torque developed by the drag-cup motor 498 to drive the contact arm 506 into engagement with the contact 510. This impresses a positive pulse on the control grid 522 of the tetrode gas discharge tube 524, ionizing the gas within the tube to discharge the capacitor 535 through the tapper control relay operating coil 260. This closes the contacts 258, 262 of tapper control relay 260 to energize the latch release coil 320 within the summation control latch relay 286, halting the operation of summation motor 294. The shaft 304 and summation control cam 302 are maintained in their position at this moment by the brake 314. When the printing control cam 236 closes the print control switch 272, which it does for a 15 minute period at 12 hour intervals in the example shown, the closure of contacts 258 and 262 also energizes the humidity tapper coil 248 through the temperature/humidity tapper selector switch 198 controlled by cam 190. Since the position of the printer wheel 220 is linked with the output voltage of the sweep potentiometer 212, the character printed is determined by the humidity control voltage at terminal 62 of station 20, for the tapping operation takes place, in the circuit shown, when the voltage developed by the potentiometer 212, and the voltage at terminal 62 are equal. The same principle may be utilized without establishment of equality between the voltages, if the turns ratio of the measured signal input transformer 424 and the sweep signal input transformer 430 are made unequal. When the arm 210 of the sweep potentiometer 212 reaches the end of the resistance winding 216, or preferably slightly earlier, the tapper disabling switch 374 is opened by cam 182 to insert the surge limiting resistor 542, in series with the energizing circuit for the operating coil of tapper control relay 260 whose operating circuit then comprises capacitor 535, tube 524, terminal J, relay 260, terminal K, and resistor 542. This prevents possible printing during the period when the unbalance sense of the measured signal and the sweep signal is restored to that prevailing at the beginning of the measuring cycle. Since this restoration is accompanied by a passage of the relative impedance values of the alternating current windings of saturable core reactors 456 and 466, through the point of balance, reversing the torque developed by drag-cup motor 458, should the conductive arm 506 bounce against the abutment 508 at this time, the contact 510 might accidentally be touched to cause an undesired printing operation. This, however, is avoided by disabling the printer circuit during the retrace interval. The printing wheel 230, provided with characters corresponding to time, is propelled by timer motor 232, and imprints on the chart 276 the time corresponding to each humidity measurement in response to the same movement of tapper bar 244.

During the period when station 20 is the active station, that is, the station in control of the metering apparatus of Figure 3, the recycle switch 161 is open, preventing energization of associated apparatus by the closure of control relay energizing switch 324 or summation reset switch 326. With the continuing rotation of shaft 168, the high dwell of cam 190 passes under its associated cam follower, actuating switches 144, 196 and 198 to connect the temperature voltage output terminal 44 of test station 20 to the measured signal input terminal D, the arm 204 of the temperature sweep potentiometer 206 to the sweep signal terminal S, and the temperature tapper coil 242, with the tapper control contact 262 of the relay 260.

Again the sweep signal output voltage is varied and passes through a value equal to the temperature output voltage to actuate the tapper control relay 260 and, this time, tapper bar 238 prints from the character set 222 of wheel 220 and the characters on printing wheel 226, corresponding to station under test, in this case station 20. The two character sets 222 and 224 rotate together, being part of the same printing wheel, and the potentiometer arms 204 and 210 rotate synchronously therewith, the whole assembly being driven from the cam shaft 218. It is thus seen that during the second half of the observation cycle, the temperature and the number of the station to which the humidity and temperature test appertain is imprinted.

Figure 5:
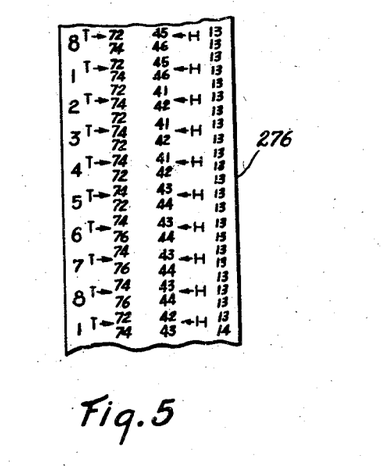
Figure 5 illustrates the printed record delivered by the complete device.

The summation cam 302 is now maintained in a position corresponding to the first humidity measurement with the continuing rotation of shaft 168. The push rod 160 falls off the cam step indexing the switch actuator arm 100 clockwise through approximately 15 degrees, permitting the switches in pile-up 68 to return to their normal opening position while closing those in pile-up 72. The cycles previously described are now completed with test station 22 in control of the metering apparatus to print the temperature, humidity, station number, and time of observation on the strip 276, as shown in Fig. 5, which has meanwhile been indexed one step forward during the transfer of active stations, by conventional mechanism, not here described or shown.

After completion of the observations for station 22, the same process is successively repeated for stations 24, 26, 28, 30, 32 and 34. When the actuator arm 100 closes the switch in pile-up 70, connected with test station 34, the recycle switch 161 is closed so that, after completion of the humidity measuring operation, when the cam rise on control energizing cam 186 closes switch 324, energy is supplied to the control latch relay 337 which assumes one position or the other depending upon the degree of rotation of the summation cam 302, which has by now been rotated a total amount proportional to the sum of the humidity indications at the various test stations which have been sequentially placed in control of the metering apparatus of Figure 3. The total rotation of the cam 302 is thus proportional to the average of the indications at the eight test stations, and the actuation of the control latch relay 337 is hence determined by the average of these values. As shaft 168 continues to rotate the switch 324 opens, and shortly thereafter reset switch 326 closes under the influence of cam 188 to retract the brake shoe 314, resetting the summation shaft 304 to its reference position. The condition of the control latch relay 337 so set in is retained until the application of a different stimulus resulting from a subsequent averaging operation, and the operation or non-operation of condition correcting motor or load 358 is so determined at 15 minute intervals.

The averaging and effectuation of control is carried out continuously whatever the condition of the printer control switches 272 and 274. When either one of these switches is closed, the same impulse which unlatches the summation control latching relay 286 also energizes the tapper bar corresponding to temperature or humidity, as the case may be. Due to the juxtaposition of the station indicating and time printing wheels, there are shown opposite each set of observations the number of the station to which the observations correspond and the time at which they were made.

The use of two sweep signal potentiometers linked to a signal printing device from the temperature/humidity indications is explained by the desirability of providing for independent circuit compensation to match variations in the temperature/humidity responsive apparatus to the distribution of the fixed character sets on the printing wheels. An increase in the source impedance feeding the potentiometers increase the rotation corresponding to a given temperature/humidity differential thus spreading the scale and vice versa. A change in the potential of the low voltage end with respect to ground offers the means for changing the point in rotation at which a predetermined output voltage is delivered through the sweep signal potentiometer thus providing for lateral scale adjustment without material change in the scale modulus.

When the apparatus is first installed, the series resistance controls 576 and 580, and the voltage control 570 and 572, are employed to adjust the circuit impedance and voltage, to insure the desired voltage vs. rotation characteristic and hence the desired scale distribution of the printing elements. This is performed initially by first placing the arm 418 of calibration switch on contact 415 on which may provide a voltage corresponding subsequently to a full test rotation of the sweep potentiometer and adjusting the applicable voltage controlling tap 570 or 572 to print the character properly associated with such voltage. Thereafter, the arm 418 may be placed on contact 417 delivering a voltage corresponding to that supplied within the first few degrees of revolution of the sweep signal potentiometer and adjusting the proper control 586 or 580 to cause the printing of the proper character from this position. With a sufficiently low value of resistor 566, these calibration operations may be substantially freed of any interlocking effect.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a voltage responsive device, a source of electric voltage, an impedance of arcuate form occupying a sector of less than 360 degrees connected to said source, a rotating arm movable in engagement with said impedance, a controlled device responsive to the voltage existing at said arm and a voltage under test, and means for disabling said controlled device during the period that said arm sweeps the open sector of said arcuate impedance.

2. In a voltage responsive device, a source of electric voltage, an impedance of arcuate form occupying a sector of less than 360 degrees connected to said source, a rotating arm movable in engagement with said arcuate impedance, current surge generating means jointly responsive to the voltage existing at said arm and a voltage under test, a controlled device in circuit with said current surge generating means, a surge limiting impedance connected in series with said controlled device, switching means connected in parallel with said surge limiting impedance, and means for maintaining said switching means in closed position substantially during the period said arm is in engagement with said arcuate impedance.

3. In a voltage responsive device, a source of electric voltage, an impedance of arcuate form occuping a sector of less than 360 degrees connected to said source, a rotating arm movable in engagement with said arcuate impedance, current surge generating means jointly responsive to the voltage existing at said arm and a voltage under test, a controlled device in circuit with said current surge generating means, and means for limiting the magnitude of the current surge passing through said controlled device during the disengagement of said arm from said arcuate impedance.

4. In voltage responsive apparatus, a first rectifying means responsive to a voltage under test, a second rectifying means responsive to a periodically varying search voltage, a first and second impedance adapted to respond to the differential output voltage of said first and second rectifying means, a center tapped source of electric voltage, means connecting one terminal of said first impedance to a first end terminal of said center tapped source of electic voltage, means connecting one terminal of said second impedance to the second end terminal of said center tapped source of electric voltage, means connecting the second terminal of said first impedance and the second terminal of said second impedance, and means for controlling a current surge generator connected between the center tap of said electric voltage source and the common terminal of said first and second impedances.

5. In combination with apparatus adapted to respond discontinuously when a voltage applied to a test terminal and a voltage applied to a search terminal are related by a predetermined ratio, a search voltage source including a source of substantially constant voltage, a potentiometer having two end terminals and an adjustable tap, a variable impedance connected at one end to one of said end terminals, means adjustable independently of said variable impedance for applying a variable fraction of the voltage of said source between the other end of said variable impedance and the other of said potentiometer end terminals, and means connecting said potentiometer with said search terminal.

6. In combination with apparatus adapted to produce an impulse when a test voltage and a search voltage are related by a predetermined ratio, a search voltage source including a source of electric potential, a resistance element having a tap movable thereover, a variable impedance having one terminal connected to a point on said resistance element, means adjustable independently of said variable impedance for applying a variable fraction of the voltage of said source between another terminal of said variable impedance and another point on said resistance element, and means connecting said resistance element with said impulse producing apparatus.

7. In combination with apparatus adapted to produce an impulse when a test voltage and a search voltage are related by a predetermined ratio, means for intermittently and exclusively applying a first test voltage and a second test voltage to said apparatus, source of electric potential, a first resistance element having a tap moveable thereover, a first variable impedance having one terminal connected to a point on said first resistance element, a first means for applying a variable fraction of the voltage of said source between another terminal of said first variable impedance and another point on said first resistance element, a second resistance element having a tap movable thereover, a second variable impedance having one terminal connected to a point on said second resistance element, a second means for applying a variable fraction of the voltage of said source between another terminal of said second variable impedance and another point on said second resistance element, and means for connecting said first resistance element with said apparatus during the application of said first test voltage thereto and for connecting said second resistance element with said apparatus during the application of said second test voltage thereto.

8. In apparatus responsive to the magnitude of a potential under test, means for varying the value of a search potential from a first to a second value and returning said search potential to said first value, a controlled device, means for actuating said controlled device when said search potential bears a predetermined ratio to said potential under test and said search potential is varying from said first value toward said second value, and means for disabling said actuating means when said search potential is varying from said second value toward said first value.

9. In apparatus for discontinuously determining the magnitude of a potential under test, a first circuit loop including a first impedance changing in magnitude in response to changes in control potential, a second circuit loop including a second impedance changing in magnitude in response to changes in control potential and having an arm common with said first circuit loop, said loops passing current through said common arm with opposing flow directions, means for operatively connecting said first potential responsive impedance with a potential under test, means for operatively applying a variable search potential varying independently of said potential under test to said second potential responsive impedance, a controlled device, and means actuating said controlled device when said search potential passes through a value reducing the current in said common arm to a minimum.

10. In apparatus for discontinuously determining the magnitude of a potential under test, a first circuit loop including a first impedance changing in magnitude in response to changes in control potential, a second circuit loop including a second impedance changing in magnitude in response to changes in control potential and having an arm common with said first circuit loop, said loops passing current through said common arm with opposing flow directions, means for operatively connecting said first potential responsive impedance with a potential under test, means for operatively applying a variable search potential varying independently of said potential under test to said second potential responsive impedance, a controlled device, and means actuating said controlled device when the current flow in said common arm passes through minimum in a predetermined sense.

11. In apparatus for discontinuously determining the magnitude of a potential under test, a first circuit loop including a first impedance changing in magnitude in response to changes in control potential, a second circuit loop including a second impedance changing in magnitude in response to changes in control potential and having an arm common with said first circuit loop, said loops passing current through said common arm with opposing flow directions, means for operatively controlling said first potential responsive impedance by a potential under test, means for operatively controlling said second potential responsive impedance by a variable search potential varying independently of said potential under test, a controlled device, means actuating said controlled device when the current flow in said common arm passes through minimum in a first sense, and means suppressing the actuation of said controlled device when the current flow in said common arm passes through minimum in a second sense.

RALPH E. STURM.
JAMES R. COSBY.

REFERENCES CITED

The following references are of record in the file of this patent:

UNITED STATES PATENTS

| Number | Name | Date |
|---|---|---|
| 2,207,343 | Fairchild | July 9, 1940 |
| 2,275,317 | Ryder | Mar. 3, 1942 |
| 2,366,913 | Le Clair | Jan. 9, 1945 |
| 2,376,599 | Jones | May 22, 1945 |
| 2,377,347 | MacKenzie | June 5, 1945 |
| 2,387,760 | Keinath | Oct. 30, 1945 |
| 2,392,916 | Cruss | Jan. 15, 1946 |